Figure 1:
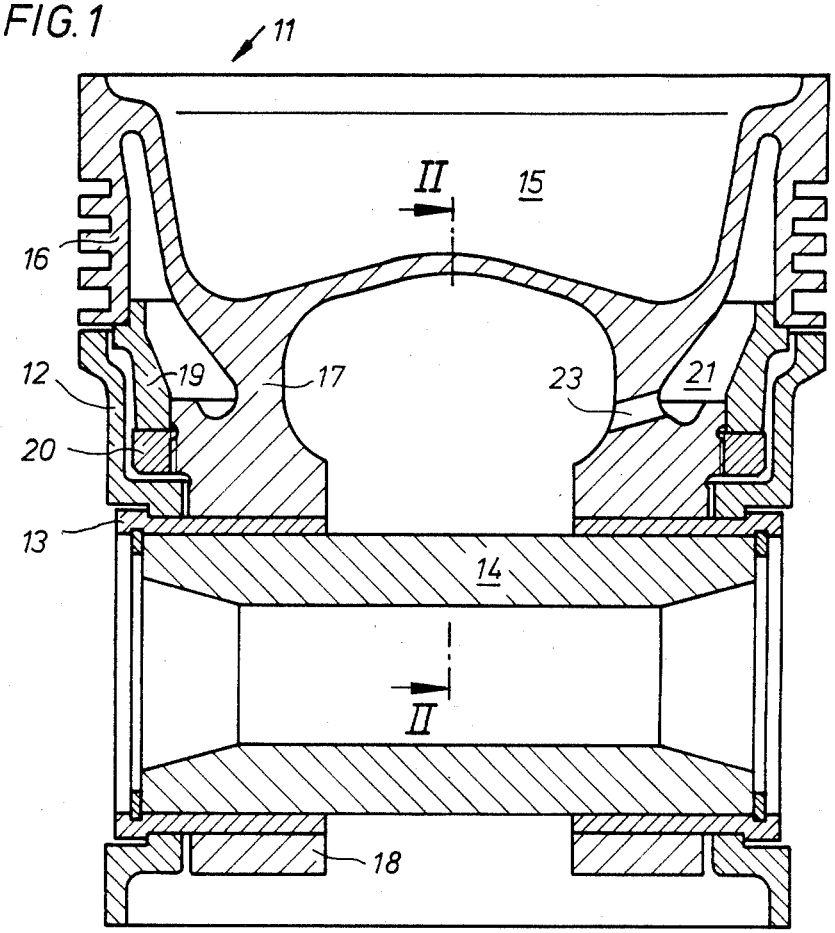

United States Patent [19]

Deutschmann et al.

[11] Patent Number: 4,577,595

[45] Date of Patent: Mar. 25, 1986

[54] PISTON FOR A RECIPROCATING PISTON INTERNAL COMBUSTION ENGINE

[75] Inventors: Herbert Deutschmann; Karl Schier, both of Friedrichshafen, Fed. Rep. of Germany

[73] Assignee: MTU Motoren-und Turbinen-Union Friedrichshafen, GmbH, Friedrichshafen, Fed. Rep. of Germany

[21] Appl. No.: 632,323

[22] Filed: Jul. 19, 1984

[30] Foreign Application Priority Data

Oct. 22, 1983 [DE] Fed. Rep. of Germany ....... 3338419

[51] Int. Cl.4 .............................. F01P 3/10; F16J 1/00
[52] U.S. Cl. ................................... 123/41.35; 92/186; 92/220; 123/193 P
[58] Field of Search ............... 123/41.35, 41.37, 41.38, 123/193 P; 92/186, 187, 216, 220, 238, 255, 189, 190

[56] References Cited

U.S. PATENT DOCUMENTS

| 2,040,293 | 5/1936 | Chandler | 92/220 |
| 2,687,931 | 8/1954 | Flynn, Jr. | 123/41.35 |
| 3,555,972 | 1/1971 | Hulsing | 92/190 |
| 3,943,908 | 3/1976 | Kubis et al. | 92/187 |

FOREIGN PATENT DOCUMENTS 2140824  2/1973  Fed. Rep. of Germany ... 123/41.35

Primary Examiner—William A. Cuchlinski, Jr.
Attorney, Agent, or Firm—Craig and Burns

[57] ABSTRACT

A piston for a reciprocating piston internal combustion engine, in which the piston top (11) is secured to the wrist pin (14) by way of two support bearings (18) independent of the piston skirt (12). The piston ring carrier (16) connected with the piston top (11) is additionally connected with the two support bearings by way of a ring-shaped support element (19). A piston with a piston top (11) results which is capable of resisting high combustion space pressures.

5 Claims, 2 Drawing Figures

PISTON FOR A RECIPROCATING PISTON INTERNAL COMBUSTION ENGINE

The present invention relates to a piston for a reciprocating piston internal combustion engine having a piston top and a piston skirt which are connected with each other by way of a wrist pin or piston pin bushings, the piston top including a combustion space recess, a piston ring carrier surrounding the combustion space recess and two support bearings connected with the bottom of the combustion space recess and supporting the piston top at the wrist pin.

A piston generally of this type is disclosed, for example, in the German Gebrauchmuster 76 27 154 and exhibits good running properties because the piston skirt is relieved of forces acting on the piston top and is correspondingly less deformed in operation. Therebeyond, no threaded bolts are necessary for the connection of the piston top with the piston skirt so that such a piston has a small mass compared to the pistons constructed in the customary manner.

Such pistons, however, entail the disadvantage that especially with high cylinder outputs the piston ring carrier portion is not able to withstand the high combustion space pressures and yields in the direction toward the crankshaft, which may lead to hard to operate pistons or to piston seizing.

It is the object of the present invention to so construct a piston of the type described above that a stable and substantially rigid piston top results.

The underlying problems are solved according to the present invention in that the piston ring carrier is additionally connected with the ring-shaped extension by way of a ring-shaped support element.

The piston ring carrier is effectively supported by this measure at the wrist pin so that a piston top deformation by the combustion space pressure is substantially avoided.

A construction of the inventive concept which is favorable from a rigidity point of view, and which requires little expenditure and weight, provides for the support element to be clamped in between the piston ring carrier and the ring-shaped extension by means of a ring nut cooperating with the ring-shaped extension.

Additional advantages result from the fact that an oil collecting device for the supply of the cooling oil ring space formed by the combustion space recess wall, the piston top, the piston ring carrier and the support element is arranged in the ring-shaped extension.

A better cooling can be achieved by this measure, and the cooling oil can no longer reach to the same extent as heretofore the cylinder inner wall through the gap between the piston top and the piston skirt, and from there the combustion space past the piston rings.

Figure 2:
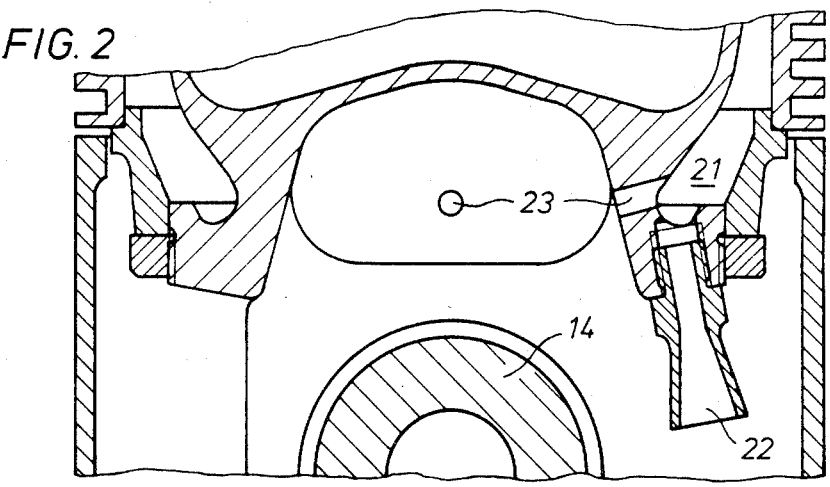

These and other objects, features and advantages of the present invention will become more apparent from the following description when taken in connection with the accompanying drawing which shows, for purposes of illustration only, one embodiment in accordance with the present invention, wherein:

FIG. 1 is a longitudinal cross-sectional view through a piston in accordance with the present invention taken in the piston wrist pin plane; and FIG. 2 is a partial longitudinal cross-sectional view taken along line II—II of FIG. 1.

Referring now to the drawings wherein like reference numerals are used throughout the two views to designate like parts, a piston for a reciprocating piston internal combustion engine includes a piston top generally designated by reference numeral 11 and a piston skirt 12, which are connected with each other by way of wrist pin bushings 13. A wrist pin 14 is arranged in the wrist pin bushings 13. The piston top 11 includes a combustion space recess 15, a piston ring carrier 16 surrounding the combustion space recess 15, a ring-shaped extension 17 arranged at the bottom the combustion space recess 15 and two support bearings 18.

The piston ring carrier 16 is connected with the ring-shaped extension 17 by way of a ring-shaped support element 19. The support element 19 is clamped in position by means of a ring nut 20 which cooperates with the ring-shaped extension 17. As is clearly evident from FIG. 1 and FIG. 2, the piston top 11 is capable of resisting high combustion space pressures because of the additional support provided by element 19. The wall of the combustion space recess 15, the piston top 11, the piston ring carrier 16 and the support element 19 form together an annular cooling oil space 21 which is supplied with cooling oil by way of an oil collecting device 22. The cooling oil can flow off toward the piston center by way of bores 23.

While we have shown and described only one embodiment in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

We claim:

1. A piston for a reciprocating piston internal combustion engine, comprising a piston top, a piston skirt and wrist pin means for interconnecting the piston top and piston skirt, the piston top including a combustion space recess, a piston ring carrier means surrounding the combustion space recess and a ring-shaped extension disposed at the bottom of the combustion space recess having two support bearing means and supporting the piston top at the wrist pin means, and means for connecting the piston ring carrier means with the ring-shaped extension including a ring-shaped support element, said ring-shaped support element being clamped between the piston ring carrier means and ring-shaped extension by a nut means cooperating with the ring-shaped extension.

2. A piston according to claim 1, wherein the piston top includes an oil collecting means associated therewith for the supply of oil to a cooling oil annular space formed by the combustion space recess wall, the piston ring carrier means, the ring-shaped support element and the ring-shaped extension.

3. A piston according to claim 1, wherein the wrist pin mean includes a wrist pin and wrist pin bushings supporting therein the wrist pin.

4. A piston for a reciprocating piston internal combustion engine, comprising a piston top, a piston skirt and wrist pin means for interconnecting the piston top and piston skirt, the piston top including a combustion space recess, a piston ring carrier means surrounding the combustion space recess and a ring-shaped extension disposed at the bottom of the combustion space recess having two support bearing means and supporting the piston top at the wrist pin means, and means for connecting the piston ring carrier means with the ring-shaped extension including a ring-shaped support element, said ring-shaped support element being clamped between the piston ring carrier means and ring-shaped extension by a nut means cooperating with the ring-shaped extension, said piston top including an oil collecting means associated therewith for the supply of oil to a cooling oil annular space formed by the combustion space recess wall, the piston ring carrier means, the ring-shaped support element and the ring-shaped extension.

5. A piston for a reciprocating piston internal combustion engine, comprising a piston top, a piston skirt and wrist pin means for interconnecting the piston top and piston skirt, the piston top including a combustion space recess, a piston ring carrier means surrounding the combustion space recess and a ring-shaped extension disposed at the bottom of the combustion space recess having two support bearing means and supporting the piston top at the wrist pin means, said wrist pin means including a wrist pin and wrist pin bushings supporting therein the wrist pin, and means for connecting the piston ring carrier means with the ring-shaped extension including a ring-shaped support element, said ring-shaped support element being clamped between the piston ring carrier means and ring-shaped extension by a nut means cooperating with the ring-shaped extension, said piston top including an oil collecting means associated therewith for the supply of oil to a cooling oil annular space formed by the combustion space recess wall, the piston ring carrier means, the ring-shaped support element and the ring-shaped extension.

* * * * *